United States Patent Office 3,639,536
Patented Feb. 1, 1972

3,639,536
STABILIZED SALIGENIN CYCLIC PHOSPHORUS ESTERS
Noboru Muramoto, Ikeda-shi, and Johan Saiga and Yoshitsugu Suzuki, Takarazuka-shi, Japan, assignors to Sumitomo Chemical Company, Ltd., Osaka, Japan
No Drawing. Filed Jan. 27, 1969, Ser. No. 794,395
Claims priority, application Japan, Apr. 6, 1968, 43/14,828; Nov. 7, 1968, 43/81,427
Int. Cl. C07d *105/04;* A01n *9/36*
U.S. Cl. 260—937
3 Claims

ABSTRACT OF THE DISCLOSURE

A stabilized composition consisting essentially of a saligenin cyclic phosphorus ester represented by the formula,

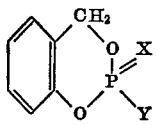

wherein X represents oxygen or sulfur and Y represents methoxy, a lower alkylthio having 1 to 4 carbon atoms, a lower alkenylthio having 1 to 4 carbon atoms, a phenylthio,

wherein $R^1$ is a lower alkyl having 2 to 4 carbon atoms, or

wherein $R^2$ and $R^3$ are a lower alkyl having 1 to 4 carbon atoms; and a stabilizer compound of a secondary arylamine including a compound having a pyrrole nucleus in the structural formula, the amount of the stabilizer compound being 0.1 to 20% by weight based on the weight of said esters, which is advantageously employed for the manufacture of insecticides.

---

The present invention relates to a process for stabilization of saligenin cyclic phosphorus esters represented by the formula

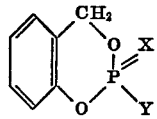
(I)

wherein X represents oxygen or sulfur and Y represents methoxy, a lower alkylthio having 1 to 4 carbon atoms, a lower alkenylthio having 1 to 4 carbon atoms, a phenylthio,

wherein $R^1$ is a lower alkyl having 2 to 4 carbon atoms, or

wherein $R^2$ and $R^3$ are a lower alkyl having 1 to 4 carbon atoms, particularly 2-methoxy-4H-1,3,2-benzodioxa-phosphorine-2-sulfide (hereinafter referred to as salithion) and 2-methoxy - 4H - 1,3,2 - benzodioxa-phosphorine-2-oxide (hereinafter referred to as salioxon). The invention also relates to insectidical compositions containing the stabilized esters.

Saligenin cyclic phosphates, particularly salithion and salioxon, show excellent insecticidal effects against a wide range of agricultural and sanitary pests and therefore the practical use of them as a pesticide for a rice crop, vegetables, fruit trees, animals, etc. has been desired. However, the saligenin cyclic phosphorus esters are remarkably unstable, because undesirable reactions such as decomposition, condensation reaction and the like occur at normal temperature even in a dark place when they are allowed to stand for a long period of time. There has not been known any process for stabilizing the saligenin cyclic phosphorus esters. The stabilization of these compounds is therefore important to maintain their commercial value.

Although the decomposition mechanism of the saligenin cyclic phosphorus esters is not completely clear, it is presumed that a polymerization reaction of the saligenin ring proceeds, because it is observed that the materials represented by the formula

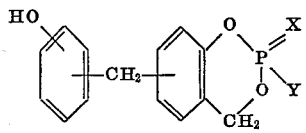

wherein X and Y are the same as defined above is formed in the initial decomposition product, and when the decomposition further proceeds, an insoluble rubbery material is formed.

Such a decomposition mechanism has never been found in the decomposition of other phosphorus esters and special consideration to the stabilization of the saligenin cyclic phosphorus esters is therefore required. Thus, one object of the present invention is to provide stabilized saligenin cyclic phosphorus esters represented by the Formula I. Other object of the invention is to provide a process for stabilization of said esters. Another object of the invention is to provide insecticidal composition containing said stabilized esters. A further object of the invention will be apparent from the following illustration.

These and other objects of the present invention can be accomplished by provision of a process for stabilization of saligenin cyclic phosphorus esters represented by the Formula I, which comprises adding a stabilizer compound of a secondary arylamine including a compound having a pyrrole nucleus in the structural formula, the amount of the stabilizer compound being 0.1 to 20% by weight based on the weight of said esters; and insecticidal compositions containing as an active ingredient the stabilized esters.

As a result of our extensive study on effective and suitable means for stabilizing the saligenin cyclic phosphorus esters, the present inventors have found that the deterioration of said esters as well as insecticidal compositions containing the same such as dusts, wettable powders, granules, emulsifiable concentrates and the like can be inhibited for a long period of time by such unexpected simple method as the addition of a small amount of the stabilizer compounds described below.

At least one secondary arylamine including compounds having a pyrrole nucleus in their structural formula, may be employed as the present stabilizer compounds. Examples of the compounds include N-phenyl-α-naphthylamine, N-phenyl-β-naphthylamine, N,N'-diphenyl-p-phenylenediamine, N,N'-ditolyl-p-phenylenediamine, diphenyl amine, 9,9-dimethyl - 9,10 - acridine, pyrrole, indole, carbazole, benzo carbazole, dibenzocarbazole, methyl-indole, tryptophane and indican.

Stabilization may be achieved by adding any one of these stabilizer compounds to said esters, the amount of the compounds being 0.1 to 20% by weight based on the weight of said esters.

A larger amount thereof may be added to obtain the similar effect. The present invention provides a very advantageous process of stabilization because the stabilizer compounds used in the present process are quite available.

The process of the present invention can advantageously be applied to the maintenance of the stability of said esters as well as insecticidal compositions containing the same such as dusts, wettable powders, granules, emulsifiable concentrates, fumigants, baits and the like. In the stabilization of the insecticidal compositions, the stabilization effect is independent of the order of blending in manufacturing insectidical compositions. The stabilizer compounds mentioned above may be employed together with other additives for inhibiting the decomposition caused by a carrier, such as anionic surfactants, nonionic surfactants, fatty acids, organic acids, organic phosphates and the like.

The following examples further illustrate the present invention, which of course, do not limit the scope of the invention. All parts and percentages herein are by weight unless otherwise indicated.

EXAMPLE 1

The amounts mentioned in Table 1 of the stabilizers of the present invention were added to salithion having a purity of 97.6 percent. The mixtures were enclosed in an ampoule and stored in a thermostat at 50° C. for 30 days. After allowing to stand, the purity of salithion was analyzed to obtain its residual percentage according to the method described in "Nogei Kagaku Zasshi," vol. 39, No. 8, pages 311 to 316 (1965). The results of the preservation test are shown in Table 1 together with the result of the control test without the additions of any stabilizer.

TABLE 1

| Stabilizer compound | Amount added (percent) | Residual salithion percentage |
|---|---|---|
| None | | 35.2 |
| Pyrrole | 0.1 | 80.1 |
| | 0.5 | 80.7 |
| | 2.0 | 83.4 |
| Indole | 0.1 | 89.1 |
| | 0.5 | 91.3 |
| | 2.0 | 93.1 |
| Carbazole | 0.1 | 89.8 |
| | 0.5 | 91.0 |
| | 2.0 | 91.5 |
| Benzocarbazole | 0.1 | 88.9 |
| | 0.5 | 91.2 |
| | 2.0 | 92.0 |
| Dibenzocarbazole | 0.1 | 89.1 |
| | 0.5 | 89.5 |
| | 2.0 | 90.0 |
| Methylpyrrole | 0.1 | 80.5 |
| | 0.5 | 80.6 |
| | 2.0 | 82.7 |
| Methylindole | 0.1 | 89.4 |
| | 0.5 | 90.7 |
| | 2.0 | 91.2 |
| Methylcarbazole | 0.1 | 90.1 |
| | 0.5 | 90.4 |
| | 2.0 | 92.7 |
| Tryptophane | 0.1 | 89.8 |
| | 0.5 | 89.0 |
| | 2.0 | 90.6 |
| Indican | 0.1 | 85.7 |
| | 0.5 | 88.4 |
| | 2.0 | 89.6 |

EXAMPLE 2

2 percent of the stabilizers of the present invention were added to salioxon having a purity of 97.1 percent. The mixtures were enclosed in an ampoule and stored in a thermostat at 50° C. for 30 days. After allowing to stand, the purity of salioxon was analyzed to obtain its residual percentage in the same manner as in Example 1.

The results of the preservation test are shown in Table 2 together with the result of the control test without the addition of any stabilizer.

TABLE 2

| Stabilizer compound | Residual salioxon percentage |
|---|---|
| None | 30.4 |
| Pyrrole | 80.5 |
| Indole | 89.2 |
| Carbazole | 90.5 |
| Benzocarbazole | 90.2 |
| Dibenzocarbazole | 90.6 |
| Methylpyrrole | 80.4 |
| Methylindole | 90.1 |
| Methylcarbazole | 91.0 |
| Indican | 88.9 |
| Tryptophane | 91.2 |

EXAMPLE 3

The amounts mentioned in Table 3 of the stabilizers of the present invention, arylamine derivatives, were added to salithion having a purity of 97.1 percent. The mixtures were enclosed in an ampoule and stored in thermostat at 40° C. and 50° C., respectively, for a definite period of time.

After allowing to stand, the purity of salithion was analyzed to obtain its residual percentage. The results of the preservation test are shown in the following table together with the result of the control test without the addition of any stabilizer compound.

TABLE 3

| Stabilizer compound | Amount added (percent) | Preservation Temp. (° C.) | Preservation Time (days) | Residual salithion percentage Addition of stabilizer | Residual salithion percentage No stabilizer |
|---|---|---|---|---|---|
| N-phenyl-α-naphthylamine | 0.1 | 40 | 90 | 91.2 | 79.1 |
|  | 0.5 | 40 | 90 | 94.8 | 79.1 |
|  | 2 | 40 | 90 | 96.0 | 79.1 |
|  | 2 | 50 | 20 | 92.1 | 50.0 |
| N-phenyl-β-naphthylamine | 0.1 | 40 | 90 | 92.3 | 79.1 |
|  | 0.5 | 40 | 90 | 95.1 | 79.1 |
|  | 2 | 40 | 90 | 97.5 | 79.1 |
|  | 2 | 50 | 30 | 92.0 | 37.5 |
| N,N'-di-β-naphthyl-p-phenylenediamine | 0.1 | 40 | 90 | 86.6 | 79.1 |
|  | 0.5 | 40 | 90 | 90.7 | 79.1 |
|  | 2 | 40 | 90 | 94.6 | 79.1 |
|  | 2 | 50 | 30 | 87.7 | 37.5 |
| N,N'-diphenyl-p-phenylenediamine | 0.1 | 40 | 90 | 86.1 | 79.1 |
|  | 0.5 | 40 | 90 | 90.0 | 79.1 |
|  | 2 | 40 | 90 | 94.3 | 79.1 |
|  | 2 | 50 | 30 | 85.1 | 37.5 |
| N,N'-ditolyl-p-phenylenediamine | 0.1 | 40 | 90 | 91.0 | 79.1 |
|  | 3 | 40 | 90 | 94.5 | 79.1 |
|  | 3 | 50 | 30 | 85.8 | 37.5 |
| N-phenyl-N'-isopropyl-p-phenylenediamine | 2 | 50 | 20 | 74.6 | 50.0 |
| A 1=1 mixture of N-phenyl-α-naphthylamine and N,N'-diphenyl-p-phenylenediamine | 0.1 | 40 | 90 | 92.1 | 79.1 |
|  | 0.5 | 40 | 90 | 95.5 | 79.1 |
|  | 2 | 40 | 90 | 96.8 | 79.1 |
|  | 2 | 50 | 30 | 93.1 | 37.5 |

EXAMPLE 4

The amounts shown in Table 4 of the stabilizers of the present invention were added to salithion having a purity of 99.3 percent and salioxon having a purity of 98.9 percent. The mixtures were enclosed in an ampoule and stored in thermostats at 40° C. and 50° C., respectively, for a definite period of time. After allowing to stand, the purity of salithion and salioxon was analyzed to obtain their residual percentage. The results of the preservation test are shown in the following table together with the result of the control test without the addition of any stabilizer.

TABLE 4

| Cyclic phosphate | Stabilizer compound | Amount added (percent) | Preservation Temp. (° C.) | Preservation Time (days) | Residual percentage Addition of stabilizer | Residual percentage No stabilizer |
|---|---|---|---|---|---|---|
| Salithion | Diphenylamine | 0.1 | 50 | 30 | 92.0 | 71.3 |
|  |  | 0.5 | 50 | 30 | 93.5 | 71.3 |
|  |  | 2 | 50 | 30 | 94.0 | 71.3 |
|  |  | 3 | 50 | 30 | 94.5 | 71.3 |
|  |  | 2 | 40 | 90 | 97.7 | 87.6 |
|  |  | 3 | 40 | 90 | 97.8 | 87.6 |
|  | 9,9-dimethyl-9,10-acridine | 0.1 | 50 | 30 | 91.6 | 71.3 |
|  |  | 0.5 | 50 | 30 | 92.8 | 71.3 |
|  |  | 2 | 50 | 30 | 93.6 | 71.3 |
|  |  | 2 | 40 | 90 | 97.2 | 87.6 |
| Salioxon | Diphenylamine-9,9-dimethyl-9,10-acridine | 2 | 40 | 90 | 97.9 | 78.2 |
|  |  | 2 | 40 | 90 | 97.6 | 78.2 |

It is clear from the above results that the stabilizers according to the process of the present invention are effective for the stabilization of saligenin cyclic phosphorus esters and their quality can be maintained for a long period of time by the addition of a small amount of the stabilizers. These stabilizers may be either directly mixed with salithion and salioxon or indirectly, for example, added to a solvent on the process of recrystallization.

EXAMPLE 5

From salithion having a purity of 97.6 percent containing 2 percent of the stabilizer of the present invention and such salithion containing no stabilizer a 25% wettable powder, a 2% dust and a 5% granule were prepared according to the recipes below. These preparations were enclosed in an ampoule and stored in a thermostat at 50° C. for 20 days.

Recipes

25% Wettable powder: Parts
- Salithion _____ 28
- Diatomaceous earth _____ 67
- Sodium salt of dioctyl sulfosuccinate ____ 5

5% Granule:
- Salithion _____ 6
- Clay _____ 90
- Polyvinyl alcohol _____ 2
- Sodium salt of dioctyl sulfosuccinate ____ 2

2% Dust:
- Salithion _____ 2.5
- Clay _____ 60.0
- Talc powder _____ 35.5
- Propyl acid phosphate _____ 2.0

After allowing to stand, the content of salithion was analyzed to obtain its residual percentage. The results of the preservation test are shown in Table 5.

Although, in this example, carbazole and N-phenyl-α-naphthylamine were used as a stabilizer, the other stabilizers according to the present invention are almost similarly effective.

TABLE 5

| Form of preparation | Stabilizer compound | Salithion (residual percent) | |
|---|---|---|---|
| | | Time of preparation | After 20 days at 50° C. |
| 25 wettable power | No stabilizer | 27.3 | 11.0 (40.3) |
| | Carbazole | 26.7 | 26.0 (97.4) |
| | N-phenyl-α-napthylamine | 26.7 | 26.2 (98.2) |
| 5% granule | No stabilizer | 5.85 | 2.33 (39.8) |
| | Carbazole | 5.74 | 5.54 (96.5) |
| | N-phenyl-α-naphthylamine | 5.74 | 5.60 (97.7) |
| 2% dust | No stabilizer | 2.45 | 0.70 (28.6) |
| | Carbazole | 2.37 | 2.19 (91.7) |
| | N-phenyl-α-naphthylamine | 2.37 | 2.21 (93.3) |

It is clear from the above results that the compounds according to the present invention are effective for the stabilization of saligenin cyclic phosphorus esters and useful in the maintenance of the quality of preparations of the compounds.

What we claim is:

1. A stabilized composition consisting essentially of a saligenin cyclic phosphorus ester represented by the formula,

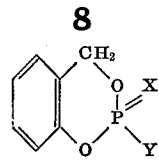

wherein X represents oxygen or sulfur and Y represents methoxy, a lower alkylthio having 1 to 4 carbon atoms, a lower alkenylthio having 1 to 4 carbon atoms, a phenylthio,

wherein $R^1$ is a lower alkyl having 2 to 4 carbon atoms, or

wherein $R^2$ and $R^3$ are a lower alkyl having 1 to 4 carbon atoms; and a stabilizer compound selected from the group consisting of pyrrole, indole, carbazole, benzocarbazole, dibenzocarbazole, methylpyrrole, methylindole, methylcarbazole tryptophane, indican, diphenylamine, 9,9-dimethyl - 9,10 - acridine, N-phenyl-α-naphthylamine, N-phenyl-β-naphthylamine, N,N'-di-β-naphthyl-p-phenylenediamine, N,N' - diphenyl-p-phenylenediamine, N,N'-ditolyl-p-phenylenediamine, and N-phenyl-N'-isopropyl-p-phenylenediamine, the amount of the stabilizer compound being 0.1 to 20% by weight based on the weight of said esters.

2. A composition according to claim 1, wherein said ester is 2-methoxy-4H-1,3,2-benzodioxaphosphorine - 2-sulfide.

3. A composition according to claim 1, wherein said ester is 2-methoxy-4H-1,3,2-benzodioxaphosphorine - 2-oxide.

References Cited

UNITED STATES PATENTS 3,275,717   9/1966   Butler _____ 260—989

CHARLES B. PARKER, Primary Examiner

A. H. SUTTO, Assistant Examiner

U.S. Cl. X.R.

260—989; 424—209

UNITED STATES PATENT OFFICE
CERTIFICATE OF CORRECTION

Patent No. 3,639,536　　　　　　Dated　February 1, 1972

Inventor(s)　Muramoto et al.

It is certified that error appears in the above-identified patent and that said Letters Patent are hereby corrected as shown below:

In the claim for priority of Japanese Appln. No. 14828/68: change "April 6, 1968" to --March 6, 1968--.

Signed and sealed this 27th day of June 1972.

(SEAL)
Attest:

EDWARD M. FLETCHER, JR.　　　　　ROBERT GOTTSCHALK
Attesting Officer　　　　　　　　Commissioner of Patents